(12) United States Patent
Kihl et al.

(10) Patent No.: US 6,222,536 B1
(45) Date of Patent: Apr. 24, 2001

(54) METHOD AND APPARATUS FOR PROVIDING A NUMBER OF SUBSCRIBERS WITH ON-LINE BANKING SERVICE EMPLOYING A PLURALITY OF BANK SYSTEMS

(75) Inventors: Gye Tae Kihl; Ik Chin Song; Choon Gil Kim; Chul Ho Lee; Young Soo Lim, all of Seoul (KR)

(73) Assignee: Korea Telecom, Seoul (KR)

( * ) Notice: Subject to any disclaimer, the term of this patent is extended or adjusted under 35 U.S.C. 154(b) by 0 days.

(21) Appl. No.: 09/000,923

(22) Filed: Dec. 30, 1997

(30) Foreign Application Priority Data

Dec. 30, 1996 (KR) .................................................. 96-76661

(51) Int. Cl.⁷ .............................. G06F 3/00; G06F 17/60
(52) U.S. Cl. ........................... 345/333; 345/331; 705/39; 705/42; 707/10; 709/203
(58) Field of Search ..................................... 345/333, 335, 345/329, 331; 705/35, 42, 39; 707/10; 709/203

(56) References Cited

U.S. PATENT DOCUMENTS 5,754,830 * 5/1998 Butts et al. ......................... 709/311
5,799,087 * 8/1998 Rosen ..................................... 705/69
5,867,153 * 2/1999 Grandcolas et al. ................. 345/326
5,870,724 * 2/1999 Lawlor et al. .......................... 705/42

* cited by examiner

Primary Examiner—Raymond J. Bayerl
Assistant Examiner—Cuong T. Thai
(74) Attorney, Agent, or Firm—Staas & Halsey LLP

(57) ABSTRACT

A relay server system for providing banking services to the subscriber comprises: a subscriber coupling unit, connected to subscriber terminals, for performing a protocol conversion process; a data storage unit for storing process control information, history information, output screen data, and subscriber information; a request processing unit for analyzing input request message to generate a corresponding handling process based on an analyzed request type and for providing a format-converted response data to the subscriber coupling means based on output screen data stored in the data storage means; and a session managing unit, in response to the input request message from the request processing means, for generating and format-converting an inquiry message based on the process control information to thereby provide the format-converted inquiry message to a corresponding bank system, and, in response to a response message from the bank system, for extracting and format-converting a response data to thereby providing the format-converted response data to the request processing means.

11 Claims, 7 Drawing Sheets

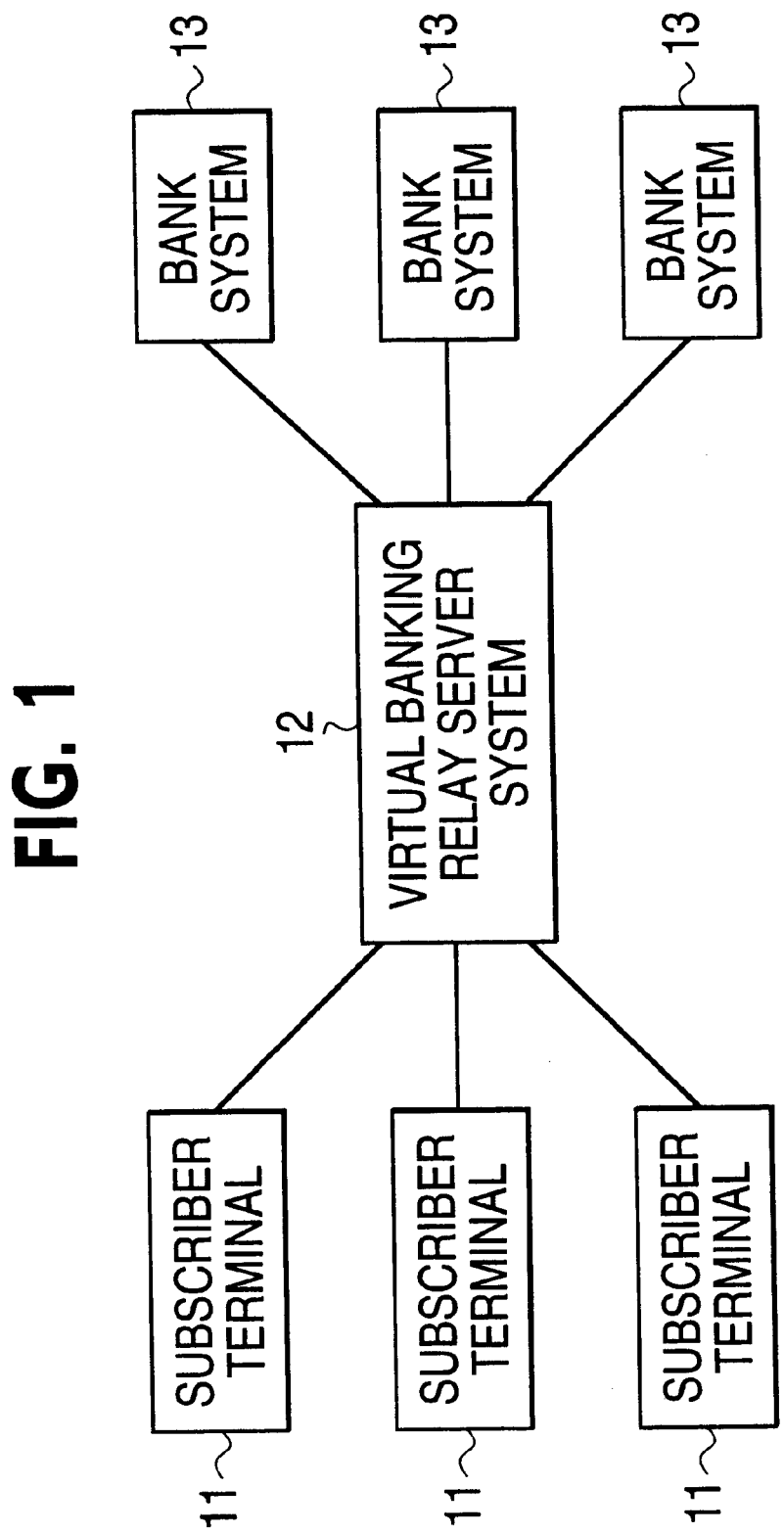

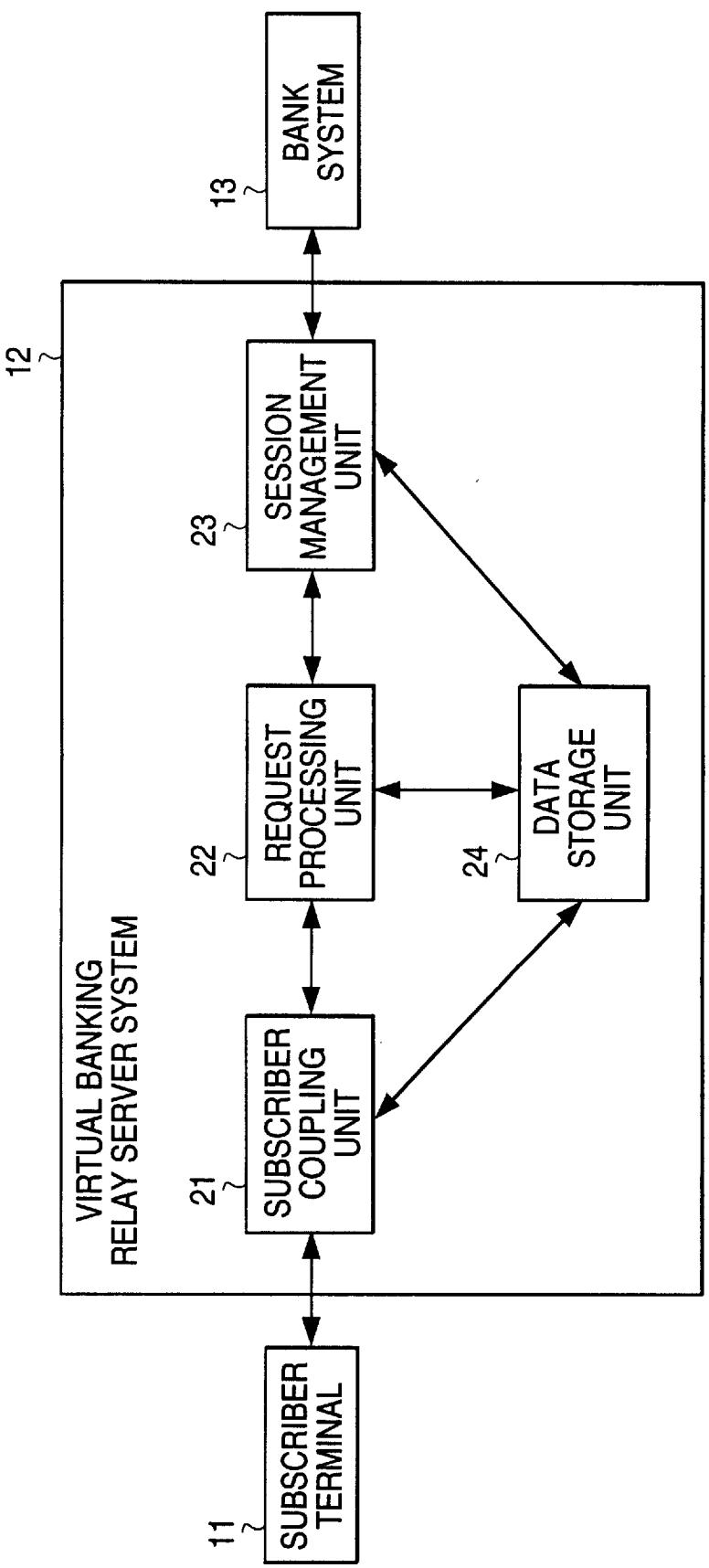

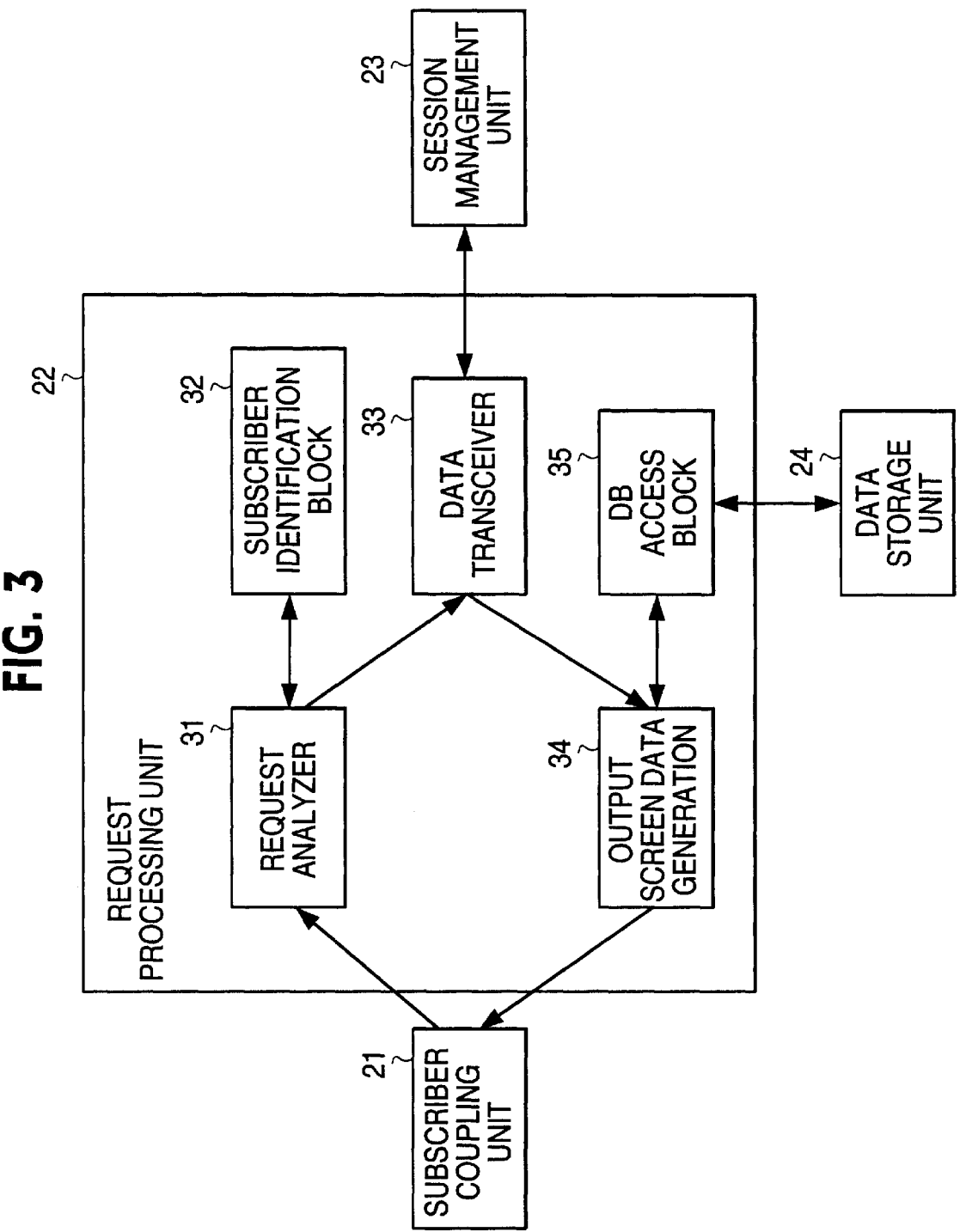

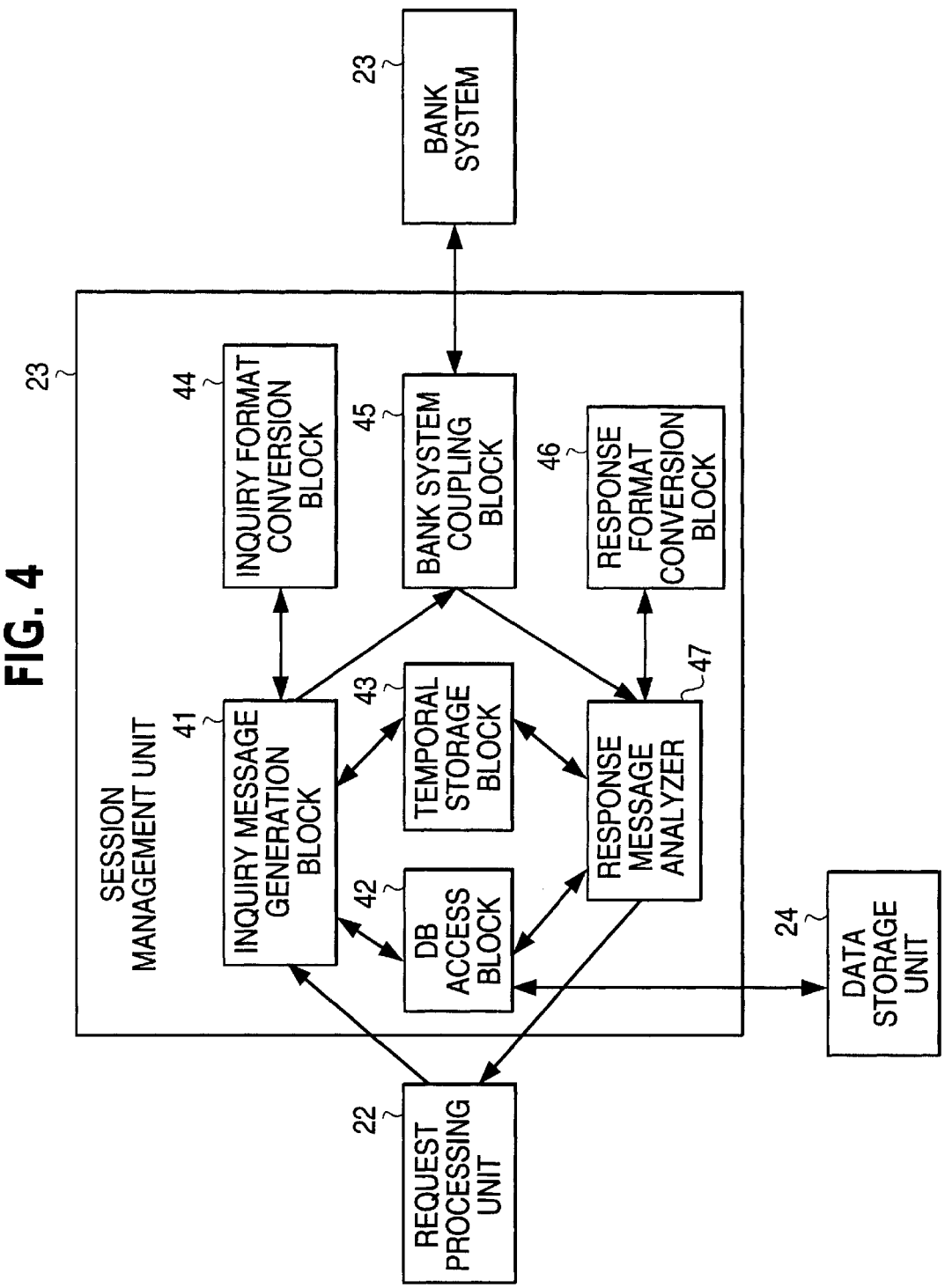

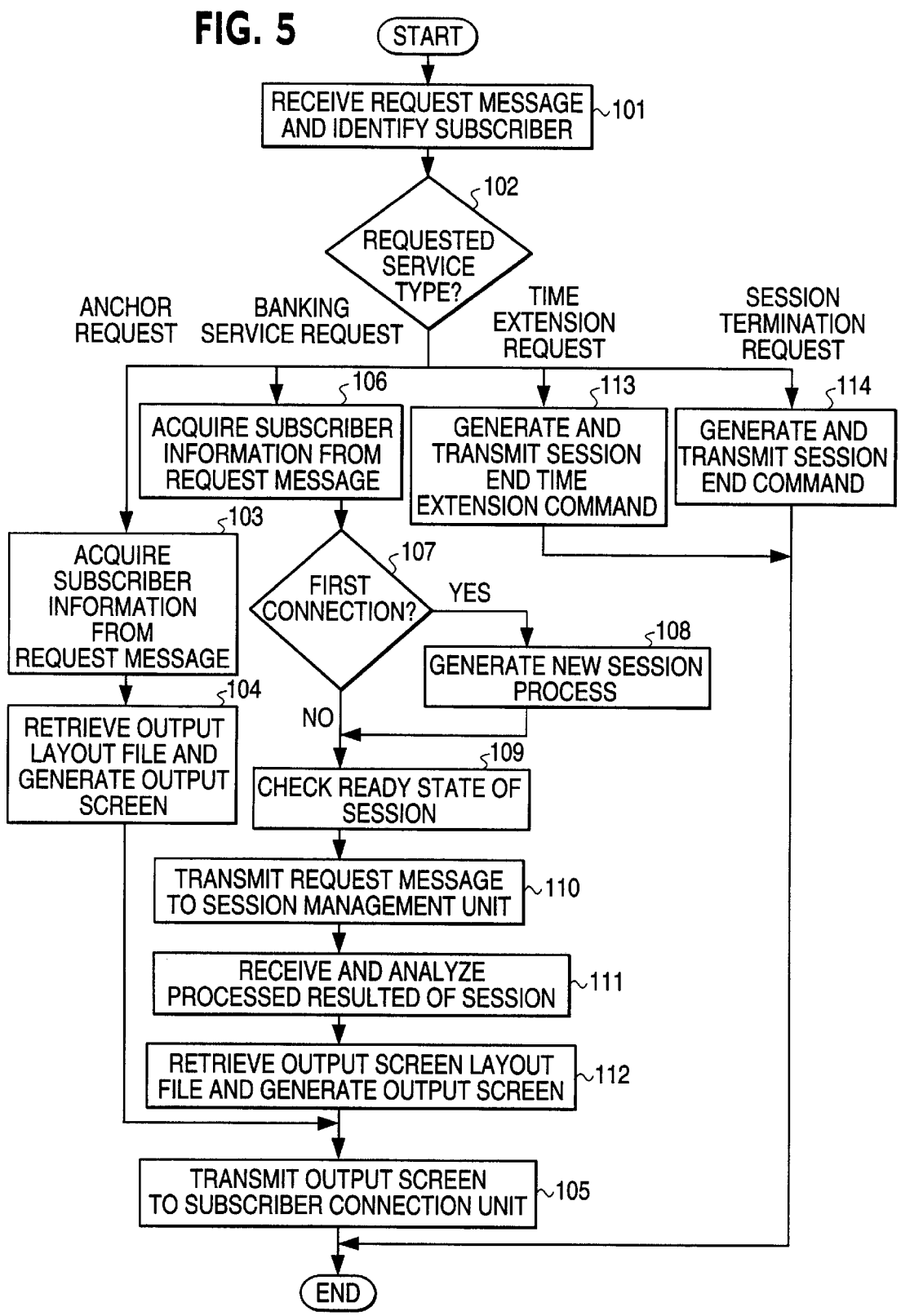

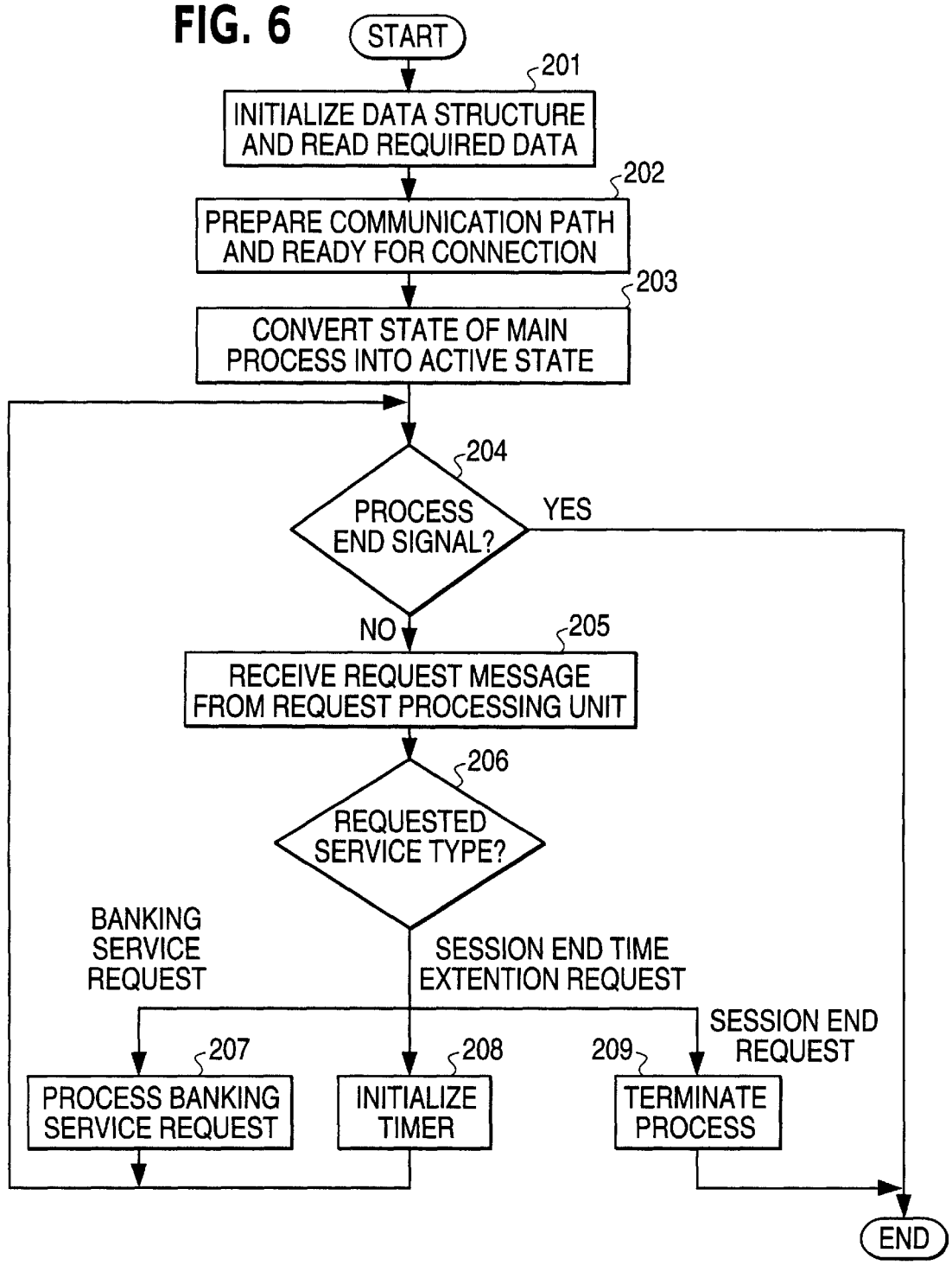

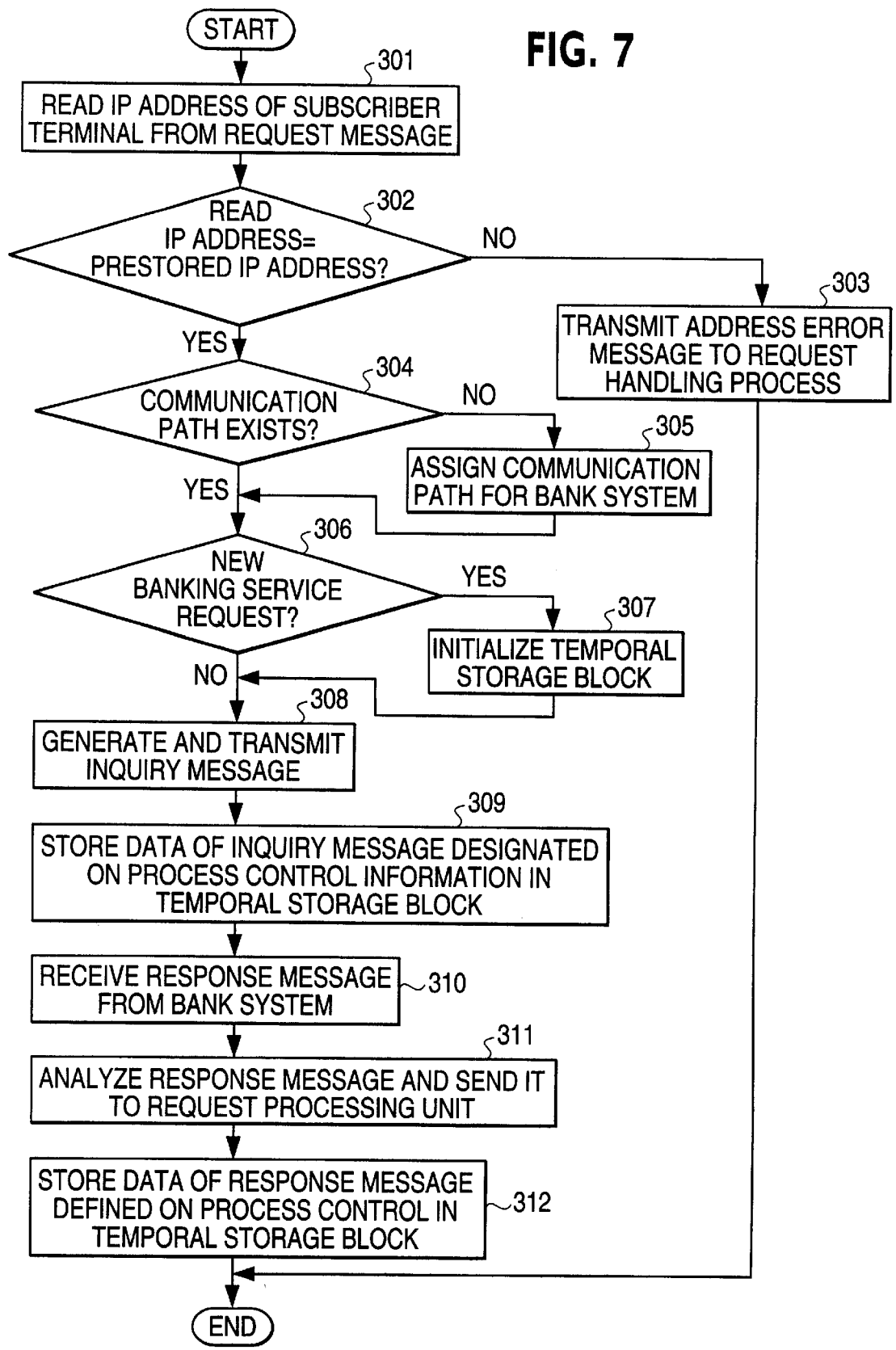

METHOD AND APPARATUS FOR PROVIDING A NUMBER OF SUBSCRIBERS WITH ON-LINE BANKING SERVICE EMPLOYING A PLURALITY OF BANK SYSTEMS

FIELD OF THE INVENTION

The present invention relates to an on-line banking system and, more particularly, to a method and apparatus which are capable of providing various on-line banking services to a number of subscribers employing a plurality of bank systems in an effective manner.

DESCRIPTION OF THE PRIOR ART

Through the use of the Internet and a powerful client software system, a bank service system has been dramatically changed. To date, most of the commercial banks have provided on-line banking services, e.g., so called home banking services to their clients by using personal computers via a public switched telephone network(PSTN), an integrated service digital network(ISDN), or a packet communication network. Further, a web service has been started for Internet subscribers.

A virtual banking system, e.g., an on-line banking system, is newly introduced and is capable of providing virtual banking services easier to use through the use of various multimedia to the subscriber instead of providing conventional character-based banking services. Further, the virtual bank system also provides various accounting services which have been supplied only by tellers of banks and can be easily updated to provide new services to the user.

In order to provide these services, a conventional virtual banking system employs customized client software for each bank so that the virtual banking services applied by each bank can be provided to the subscribers without needing any other requirements.

However, there is a problem that, in order for user to simultaneously or randomly receive banking services from a number of bank systems, a number of customized client software systems must be provided. Further more, in order to provide newly updated banking services to the user, another updated customized client software system can be needed by the user since it is difficult to update the conventional customized client software system.

SUMMARY OF THE INVENTION

It is, therefore, a primary object of the invention to provide an improved method and apparatus, for use in a virtual banking system, which are capable of providing various on-line banking services to a number of subscribers employing a plurality of bank systems in an effective manner.

In accordance with one aspect of the present invention, there is provided a relay server system, for use in an on-line banking system, connected between a number of subscriber terminals and a plurality of bank systems, for providing banking services to the subscriber, which comprises: subscriber coupling means, connected to the subscriber terminals, for performing a protocol conversion process; data storage means for storing process control information, history information, output screen data, and subscriber information; request processing means for analyzing an input request message to generate corresponding handling process based on an analyzed request type and for providing a format-converted response data to the subscriber coupling means based on output screen data stored in the data storage means; and session managing means, in response to the input request message from the request processing means, for generating and format-converting an inquiry message based on the process control information to thereby provide the format-converted inquiry message to a corresponding bank system, and, in response to a response message from the bank system, for extracting and format-converting a response data to thereby provide the format-converted response data to the request processing means.

In accordance with another aspect of the present invention, there is provided a method of providing on-line services for a number of subscribers through the use of a relay server system connected to a plurality of bank systems, which comprises: a) initializing a data structure in a session process and establishing the communication path between the session process and a request handling unit; b) when a request message is inputted from a subscriber, performing a subscriber identification process and analyzing the type of the request in the request handling unit; c) when the type of the request is an output screen request, acquiring subscriber information from the request message to generate an output screen based on the acquired subscriber information, which is then coupled to the subscriber; d) when the type of request type is a session end time extent request, providing a session end time extension command to the session process to initialize a timer thereof; e) when the type of request is a banking service request, extracting subscriber information from the request message to provide a subscriber request to the session process in a ready state; f) identifying an internet protocol address of the subscriber, establishing a communication path to a corresponding bank system, generating and format-converting an inquiry message, providing the format-converted inquiry message to the corresponding bank system 13 and temporarily storing data designated as save; g) when a response message is received from the corresponding bank system, analyzing and format-converting the response message to generate a format-converted response message to be relayed to a request handling process and to temporarily store data designated as save; and h) retrieving output layout data based on the format-converted response message to generate an output screen to be applied to the subscriber.

BRIEF DESCRIPTION OF THE DRAWINGS

The above and other objects and features of the present invention will become apparent from the following description of preferred embodiments given in conjunction with the accompanying drawings, in which:

FIG. 1 is a schematic block diagram of a virtual banking system employing a virtual banking relay server system in accordance with the present invention;

FIG. 2 is a detailed block diagram of the virtual banking relay server system shown in FIG. 1;

FIG. 3 is a detailed block diagram of the request processing unit shown in FIG. 2;

FIG. 4 is a detailed block diagram of the session management unit shown in FIG. 2;

FIG. 5 is a flow chart showing the operation of the request processing unit in accordance with the present invention;

FIG. 6 is a flow chart illustrating the operation of the session management unit in accordance with the present invention; and FIG. 7 is a flow chart demonstrating the operation of the virtual banking relay server system upon receiving a banking service request in accordance with the present invention.

DETAILED DESCRIPTION OF THE PREFERRED EMBODIMENTS

Referring to FIG. 1, there is shown a virtual banking system. The virtual banking system includes a number of subscriber terminals 11, a virtual banking relay sever system 12, a plurality of bank systems 13; and serves to simultaneously or selectively provide on-line banking services for a plurality of bank systems to a number of subscribers.

Each of the bank systems 13 is a conventional banking accounting system for dealing with various banking services, e.g., checking balance, transferring funds and the like; and serves to receive and process input data from one or more external devices and provide processed results to an output device.

The virtual banking relay server system 12 is connected between the subscriber terminals and the bank systems; and serves to relays subscriber request messages as inquiry messages to the bank systems 13 and process output data as response messages from the bank system through the use of some multimedia tools to thereby provide the processed data, e.g., bank system responses, to the subscriber terminals.

An "inquiry message", hereinafter, means a data stream, which is coupled to the bank systems, and a "response message" denotes a data stream, which is outputted from the bank system 13. When a subscriber selects a desired one of banking service items contained in a menu screen of a subscriber terminal, the virtual banking relay server system 12 provides an input screen for the selected banking service item to the subscriber's terminal 11.

When the subscriber select a desired service item through the use of the input screen provided in a subscriber terminal 11, the virtual banking relay server system 12 generates an inquiry message by using input data and then relays the inquiry message to a corresponding bank system 13. The virtual banking relay server system 12 transmits a response message outputted from the corresponding bank system 13 to the subscriber terminal 11 by using an output screen layout file for displaying the response message. The output screen can also include various items for requesting input operations of the subscriber.

Referring to FIG. 2, there is shown a detailed block diagram depicting the virtual banking relay server system 12, which includes a subscriber coupling unit 21, a request processing unit 22, a session management unit 23, and a data storage unit 24.

The data storage unit 24 includes a first storage location for storing subscriber access history information, a second storage location for storing data access information, a third storage location for storing output screen layout information, and a fourth storage location for storing process control information.

The first storage location serves to store subscriber access history information which is mornitered by the virtual banking relay server system 12. The subscriber access history information is used for acquiring and analyzing all of events occurring in the virtual banking relay server system 12 by the banking systems 13.

The second storage location includes resources, e.g., various multimedia data for use in visually providing virtual banking services, data for use in an identification of the subscriber, various code maps, and shared objects. The resources constitute two type portions: common portions commonly use in all of the bank system 13; and exclusive portions for exclusively use in each bank system 13.

The third storage location is a file system for storing the output screen layout information to be provided to the subscriber terminals 11, which includes a menu screen, banking service initial screen, a response screen and the like.

The fourth storage location is a file system for storing the process control information representing: message formats to be exchanged between the virtual relay server system and the bank systems 13 when the subscriber bank service request occurs; and methods of constructing fields contained in the message and manipulating contents of the fields contained therein.

The subscriber coupling unit 21 is connected to a number of the subscriber terminals 11 and is provided with a server having a hyper text transfer protocol(HTTP) emulation function. When a request representing the use of a common gate way interface(CGI) is issued by a subscriber terminal 11, the subscriber coupling unit 21 relays the request to the request processing unit 22 and provides the HTML format message outputted from the request processing unit 22 to the subscriber terminal 11. Furthermore, the subscriber coupling unit 21 receives audio and video data, which can be used in providing the video conference and multimedia circumstances, from the data storage unit 24 to provide them to the subscriber terminal 11.

The request processing unit 22 receives service request messages from the subscriber terminals 11 to generate corresponding processes to the service request messages. The request processing unit 22 includes various type of processes, e.g., a request handling process a, document acquisition process a, session control process and the line. Each of these processes is called by the HTTP server whenever the subscriber service request message occurs in order to process the subscriber service request message.

The subscriber request message includes a banking service request, a session control request and an anchor request for requesting output screen layout files, wherein the banking service request needs a commuication with the session process and is processed by using the request handling process. The anchor request is handled by using the document acquisition process; and the session control requests are processed by using respective session control processes based on the type of the control requests. The session control process contains a process for extending the session end time, a process for terminating the session and the like.

The session management unit 23 serves to maintain and manage sessions for the subscribers communicating with the bank systems 13 through the use of the virtual banking relay server system 12. For each subscriber, a session process is generated and terminated in case an end request is issued by the corresponding subscriber terminal and, during a time out period, there is no subscriber request message.

The session management unit 23 performs the following functions:

First, a portion or all of the data inputted by the subscriber stored in a cache memory contained therein during a time period designated by the process control information stored in the data storage unit 24. In this case, data of a field defined as L on the process control information is stored in the cache memory until the session is terminated, and data of a field designated as S on the process control information is also stored in the cache memory until another type of banking service is initiated. When data of a same field already exists in the cache memory, the data is overwritten thereon and the data expired by a storage period is then deleted. As a result, all of the data to be transmitted to the bank system 13 need not be repetitively inputted thereto during the banking services and the virtual banking relay server system 12 can generate inquiry messages by only using the data stored in the cache memory.

Second, a response message inputted from the bank system 13 is analyzed and data of a field thereof designated as "save" on the handling control information is stored in the cache memory during a predetermined storage period.

Third, data of a field thereof designated as "reuse" in the handling control information retrieved from the cache memory and the inquiry message is constructed by using the retrieved field data.

Fourth, before transmission of the inquiry message, an inquiry format conversion process for data inputted by the subscriber and the reused data is performed. The handling control information includes the format conversion rule for each field data. The inquiry format conversion routine is implemented by using the shared objects, wherein the inquiry format conversion routine servers perform the conversion process by using received field data and format conversion codes and return the conversion results. That is, since, when a new format conversion rule for processing a banking service for a specific bank system is required, the corresponding inquiry format conversion routine is programmed and the new format conversion rules are assigned in the process control information, the format conversion process can be adaptively performed.

Fifth, the response message outputted from the bank system is analyzed and the response format conversion process is performed before relaying them to the subscriber. The response format conversion routine and the format conversion rules are identical to those of the inquiry format conversion process.

Sixth, it is checked whether the subscriber requesting the service is identical to the registered owner to thereby prohibit a hacking for the session process.

Seventh, the subscriber banking information, e.g., a bank account list, is acquired and cached until the session is terminated. Therefore, the subscriber can select input items, e.g., an account number and the like, on the pull-down menu without manually inputting them.

Eighth, all of the events occurring in the handling process, for on-line banking services are registered in the history information.

Referring to FIG. 3, there is shown a block diagram of the request processing unit 22 which includes a request analyzer 31, a subscriber identification block 32, a data transceiver 33, an output screen data generation block 34, and a data base access block 35.

The request analyzer 31 analyzes a request message inputted from the subscriber to generate a corresponding process. At the same time, the request analyzer 31 requests an identification for the subscriber to the subscriber identification block 32.

At the subscriber identification block 32, the subscriber identification process is performed in response to the request and the result is then relayed back to the request analyzer 31.

The data transceiver 33 serves to communicate with the session management unit 23 based on the type of the process generated by the request analyzer 32.

The output screen generation block 34 retrieves a corresponding output layout file via the database access block 35 from the data storage unit 24 and writes the subscriber session information inputted form the data transceiver 33 on the corresponding output layout file to thereby generate the output screen which is coupled to the subscriber coupling unit 21.

The database access block 35 accesses the data stored in the data storage unit 24 in response to a request from the output screen generation block 34 and the subscriber identification block 32.

Referring to FIG. 4, there is shown a block diagram of the session management unit 23, which is provided with an inquiry message generation block 41, a database access block 42, a temporal storage block 43, an inquiry format conversion block 44, a bank system coupling block 45, a response format conversion block 46 and a response message analyzer 47.

The inquiry message generation block 41 receives the inquiry data from the request processing unit 22, wherein the inquiry data contains a message type, a service start flag, an inquiry message name, an internet protocol/(IP) address, a common response name, subscriber input data, etc. When the service start flag is not a NULL state, the inquiry message generation block 41 initializes the temporal storage block 43 and retrieves an inquiry message syntax corresponding to the inquiry message name via the database access block 42 from the data stage unit 24 to thereby generate an inquiry message based on the inquiry message syntax. Thereafter, the inquiry message is relayed to the inquiry format conversion block 44. Furthermore, the inquiry message generation block 41 receives the format-converted inquiry message and stores field data thereof designated as "save" in the temporal storage block 43. And then, the format-converted inquiry message is fed to the bank system coupling block 45.

The inquiry format conversion block 44 converts the inquiry message into a format-converted inquiry message by using the format conversion rules designated in the process control information and the format-converted inquiry message is returned to the inquiry message generation block 41.

In the inquiry message generating process, the inquiry message generation block 41 initializes an inquiry data buffer, e.g., the temporal storage block 43 and updates the inquiry data buffer by using default values for field data of the inquiry message designated on the process control information. Thereafter, field values thereof, which are defined as the acquisition method and designated as post or postable on the process control information, are updated by using the subscriber input data. Further, field values, which are defined as the acquisition method thereof and represented as reuse, are updated by using data stored in the temporal storage block 43. The format-converted data outputted from the inquiry data conversion device 44 is sequentially provided into the inquiry message region having the number of bytes designated in the process control information to thereby generate an inquiry message to be transmitted to the bank coupling block 45.

The bank system coupling block 45 serves to couple the session management unit to the bank systems 13.

The bank system 13 receives and analyzes the format-converted inquiry message and process inputted request contents based on the analyzed results to thereby provide the corresponding response message to the bank system coupling block 45.

The response message includes a common response portion and an exclusive response portion, wherein the common response portion can be recognized at the reception of the subscriber service request.

The response message analyzer 47 analyzes the common portion of the response message, when the response message is received via the bank system coupling block 45. The common portion of the response message has a field corresponding to the response message code. As a result, a response message name corresponding to the response message code can be detected by using the code map.

Thereafter, the response message analyzer 47 analyzes the response message by using the process control information corresponding to the response message name. As a result, field data designated as save on the process control information is stored in the temporal storage block 43, and then the extracted response data is relayed to the response format conversion block 46.

The response format conversion block 46 converts the extracted response data by using the format conversion rules designated on the handling control information to generate a format-converted response message to be coupled to the response message analyzer 47.

The response message analyzer 47 relays the format-converted response message to the request processing unit 22.

Referring to FIG. 5, there is illustrated a flow chart 22 showing the operation of the request processing unit in accordance with the present invention.

After the start step, at step 101, when a request message is received from a subscriber terminal 11, a subscriber identification is checked and, at step 102, the requested service type is analyzed based on the request message.

As a result, if the requested service type is an anchor request for obtaining the output screen layout file, at step 103, the corresponding information including, e.g., a session identifier, an output layout file name, a history list, an object window and the like, is acquired from the request message inputted from the subscriber terminal.

At step 104, the output screen layout file requested is retrieved and an output screen is generated by combining the subscriber session information with the output layout file. Thereafter, at step 105, the output screen is transmitted to the subscriber coupling unit 21.

When the requested service type is the banking service request, at step 106, subscriber information including , e.g., a session identifier, a service start flag, an inquiry message name, a common response portion name, an output layout file name, history information, object windows, a subscriber terminal address, subscriber input data, is acquired from the request message.

And then, at step 107, it is checked whether it is a first connection and, if so, the process goes to step 108. At step 108, a new session process is generated. If not, or the new session process has been generated, at step 109, a ready state of the session is checked and, when the session process is in the ready state, at step 110, the request message is manipulated and transmitted to the session process of the session management unit 23.

Thereafter, when processed results from the session management unit 23 is received, at step 111, the processed result is analyzed to thereby obtain an output screen layout file name. And then, at step 112, the output screen layout file is retrieved based on the output screen layout file name and the output screen is generated by combining the subscriber session data, the processing results with the output screen layout file. At step 105, the output screen is then relayed to the subscriber coupling unit 21.

When the requested service type is an end time extension request, at step 113, a session end time extension command is generated and provided to the session process. And then the process is terminated. When the requested service type is a session termination request, at step 114, the session end command is generated and transmitted to the session process. And then the process is terminated.

Referring to FIG. 6, there is shown a flow chart depicting the operation of the session management unit 23 in accordance with the present invention.

At step 201, the data structure is initialized and the required data is retrieved. In order to transmit the request message or the session control request to the session process, at step 202, since it is needed that the communication path is formed between the session process and the request process unit, a socket for establishing the communication path is assigned to the session process. A notice representing the connection ready state is issued to the request process unit to thereby ready the connection with the request handling process.

At step 203, when the session process is connected to the request handling process, the state of the parent process is converted into an active state by using a signal and, at step 204, it is determined whether the process end signal is issued. When the process end signal is not issued, at step 205, the request message is received from the request process unit 22 and, at step 206, the service request type is checked and determined.

When the service request type is the banking service request, at step 207, the banking service request is processed. When the service request type is the session end time extension request, at step 208, the timer is initialized. When the service request type is the session end request, at step 209, the process is terminated.

Referring now to FIG. 7, there is shown a flow chart demonstrating the process for handling the banking service request in accordance with the present invention. After the start step, at step 301, an IP address of the subscriber terminal 11 is retrieved from the request message of the request handling process and, at step 302, the IP address contained in the request message is compared with the prestored IP address of a current terminal owner.

When the IP address is not identical to the prestored IP address, at step 303, the address error message is transmitted to the request handling process and the process is terminated.

When the IP address is identical to the prestored IP address, at step 304, the communication path for the corresponding bank system 13 is checked and, when the communication path exists, at step 305, the communication path for the corresponding bank system 13 is assigned. When the communication path establishing process has failed, the error message is transmitted to the request processing unit 22 and the process is terminated.

When the communication path is established, at step 306, it is determined whether the new banking service start request is issued. If the new banking service request is issued, at step 307, the temporal storage block 43 is initialized. If not or the temporal storage block 43 has been initialized, at step 308, the inquiry message is generated, format-converted, and transmitted to the corresponding bank system.

As described by using FIG. 4, in the inquiry message generation process, the inquiry data buffer, e.g., the temporal storage block 43, is initialized and updated by using default field values designated on the process control information. And then data of fields designated as post and postable on the process control information is updated by using input data provided by the subscriber, and values of fields defined as reuse is updated by using data stored in the temporal storage block. The format-converted data is written into the inquiry message region having the number of bytes defined on the process control information to thereby generate the format-converted inquiry message.

After the format-converted inquiry message is transmitted to the corresponding bank system 13, at step 309, the data of the inquiry message defined as save on the process control information is then stored in the temporal storage block 43 and the process waits for the response message.

When the response message is received from the corresponding bank system 13, at steps 310 and 311, the response message is analyzed by using the process control information and response data extracted from the response message is format-converted by using prestored rules and then relayed to the request handling process. Thereafter, at step 312, data of the inquiry data defined as save on the process control information is stored in the temporal storage block 43.

As demonstrated above, in the present invention, it is readily appreciated that on-line banking services for a plurality of banks can be effectively provided to a number of subscribers, each having an HTTP emulation by using the inventive relay server system connected therebetween. Furthermore, the relay server system is capable of providing an effective flexibility in the online services for the subscribers by using a number of request handling processes and the subscribers and the bank system connections to thereby implement various on-line services for the subscriber in a simplified manner.

While the present invention has been shown and described with reference to the particular embodiments, it will be apparent to those skilled in the art that many changes and modifications may be made without departing from the spirit and scope of the invention as defined in the appended claims.

What is claimed is:

1. A relay server system, used in an on-line banking system, connected between a number of subscriber terminals and a plurality of bank systems, for providing banking services to the subscriber, comprising:

subscriber coupling means, connected to the subscriber terminals, for performing a protocol conversion process:

data storage means for storing process control information, history information, output screen data, and subscriber information;

request processing means for analyzing an input request message to generate a corresponding handling process based on an analyzed request type and for providing format-converted response data to the subscriber coupling means based on output screen data stored in the data storage means; and session managing means, in response to the input request message from the request processing means, for generating and format-converting an inquiry message based on the process control information to thereby provide the format-converted inquiry message to a corresponding one of the bank systems, and, in response to a response message from the corresponding bank system, for extracting and format-converting a response data to provide the format-converted response data to the request processing means;

wherein the session managing means comprises:

databasee access means for accessing data stored in the data storage means, temporal data storage means for temporarily storing data until a session or a banking service is terminated, bank system connection means for coupling the session managing means to the bank systems, inquiry message generation means for generating and format-converting an inquire message based on the request message and the process control information to thereby provide the format-converted inquiry message to the bank system connection means and to store field data thereof designated as save on the handling control information to the temporal data storage means, inquiry data format conversion means for format converting the inquiry message based on format conversion rules for each field of the inquiry message to thereby provide the format-converted inquiry message to the inquiry message generation means, wherein the format conversion rules are contained in the process control information, a data transceiver for exchanging data with the session managing means, response message analyzing means for analyzing a response message inputted from the bank system connection means to provide field data of the response data designated as save on the handling control information to the temporal data storage means and for receiving a format-converted response message to relay the format-converted response message to the data transceiver means, and response data format conversion means for format converting the response message based on format conversion rules for each field of the response message to thereby provide the format-converted inquiry message to the response message analyzing means, wherein the format conversion rules are contained in the process control information.

2. The relay server system as recited in claim 1, wherein the data storage mean comprises:

first storage means for storing subscriber access history information;

second storage means for storing resources having multimedia data, data for checking the subscriber identification, code maps and shared objects;

third storage means for storing output screen layout data having a menu screen, a bank service initial screen and a response screen to be provided to the subscriber terminals; and fourth storage means for storing data representing a message format used in the banking services, data designating methods for generating field data contained in the message and data defining methods for manipulating the field data.

3. The relay server system as recited in claim 2, wherein the first storage means includes a common portion commonly used in all of the bank systems and an exclusive portion exclusively used in each of the bank systems.

4. The relay server system as recited in claim 3, wherein the request processing means comprises:

request analyzing means for analyzing a service request type to generate a corresponding process and request a subscriber identification;

subscriber identifing means, in response to the request for the subscriber identification, for performing a subscriber identification procedure by using the subscriber information to thereby provide an identified result to the request analyzing means:

data transceiver means, connected to the request analyzing means, for exchanging data with the session managing means:

database access means for accessing data stored in the data storage means: and output screen generation means for retrieving an output screen layout file via the database access means from the data storage means and for writing input subscriber session information provided from the data transceiver means on the output screen layout file to thereby generate output screen data which is relayed to the subscriber coupling means.

5. The relay server system as recited in claim 1, wherein the inquiry message generation process initializes and updates the temporal storage means by using default values of fields designated on the process control information; updating the field data designated as post and portable on the process control information by using input data provided by the subscriber; updates the field values defined as reuse by using data stored in the data storage means; and writes the format-converted data into the inquiry message region having the number of bytes defined on the process control information to thereby generate the format-converted inquiry message to be transmitted to the corresponding bank system.

6. The relay server system as recited in claim 1, wherein the response message analyzing means extracts a response message name from the response message by using the process control information corresponding to the common portion of the response message by analyzing the common portion of the response message and for analyzing the response message by using the process control information corresponding to the response message name.

7. A method of providing on-line services for a number of subscribers through the use of a relay server system connected to a plurality of bank systems, comprising:

a) initializing a data structure in a session process and establishing the communication path between the session process and a request handling unit;

b) when a request message is inputted from one of the subscribers, performing a subscriber identification process and analyzing the type of the request in the request handling unit;

c) when the type of the request is an output screen request, acquiring subscriber information from the request message to generate an output screen based on the acquired subscriber information, which is then coupled to the one subscriber;

d) when the type of request type is a session end time extent request, providing a session end time extension command to the session process to initialize a timer thereof;

e) when the type of request is a banking service request, extracting subscriber information from the request message to provide a subscriber request to the session process in a ready state;

f) identifying an internet protocol address of the one subscriber, establishing a communication path to a corresponding one of the bank systems, generating and format-converting an inquiry message, providing the format-converted inquiry message to the corresponding bank system and temporarily storing data designated as save;

g) when a response message is received from the corresponding bank system, analyzing and format-converting the response message to generate a format-converted response message to be relayed to a request handling process and to temporarily store data designated as save;

h) retrieving output layout data based on the format-converted response message to generate an output screen to be applied to the subscriber;

wherein said step (e) comprises:

e1) extracting a session identifier, a service start flag, an inquiry message name, a common response portion name, an output layout file name, history information, object windows, a subscriber terminal address and subscriber input data from the request message and determining whether the request is issued a first time;

e2) when the request is issued the first time, generating a new session process: and e3) when the request is not issued the first time or the new session process is generated, checking a session ready state and, when the session process indicates a ready state, processing the request message to provide a processed request message to the session process.

8. The method as recited in claim 7, wherein said step c) comprises:

c1) acquiring information having a session identifier, an output layout file name, history information and object windows;

c2) retrieving an output layout file requested by the one subscriber from data storage means and adding the subscriber session information to the output layout file to generate an output screen; and c3) providing the output screen to the one subscriber.

9. The method as recited in claim 7 , wherein said step f) comprises:

f1) extracting the internet protocol address of the subscriber terminal from the request message for comparison with that of the current session owner;

f2) if so, checking whether a communication path to the corresponding bank system exists;

f3) if the communication path does not exist, assigning a communication path to the corresponding bank system and checking whether the request is a banking service start request;

f4) if the communication path does exist, initializing the temporal data storage means f5) if the communication path does not exist or after the initialization process is completed, generating and format-converting an inquiry message to provide the format-converted inquiry message to the corresponding bank system; and f6) storing data of the inquiry message designated as save on the handling control data in the temporal data storage means and waiting for the reception of a response message corresponding to the inquiry message from the corresponding bank system.

10. The method as recited in claim 9, wherein said step f5) includes f51) initializing and updating the temporal data storage means by using default values of fields designated on the process control information:

f52) updating the field data designated as post and portable on the process control information by using input data by the one subscriber;

f53) updating the field values defined as reuse by using data stored in the temporal data storage means; and f54) sequentially writing the format-converted data into the inquiry message region having the number of bytes defined on the handling control information.

11. The method as recited in claim 7, wherein said step g)includes:

g1) when the response message is received from the corresponding bank system, analyzing a common response portion of the response message by using the process control information corresponding to the common response portion name and identifing a response message name:

g2) analyzing the response message by using the process control information corresponding to the response message name;

g3) format-converting response data extracted from the response message by using prestored format conversion rules to relay the format-converted response message to the request processing means; and g4) storing data of the response data defined as save on the handling control information in the temporal storage means.

* * * * *